INVENTORS:
JAMES A. TRENT
HANS E. KUBITSCHEK
HARVEY E. HOOK
FRED H. CAUDEL
BY: *Louis J Bovasso*
THEIR ATTORNEY

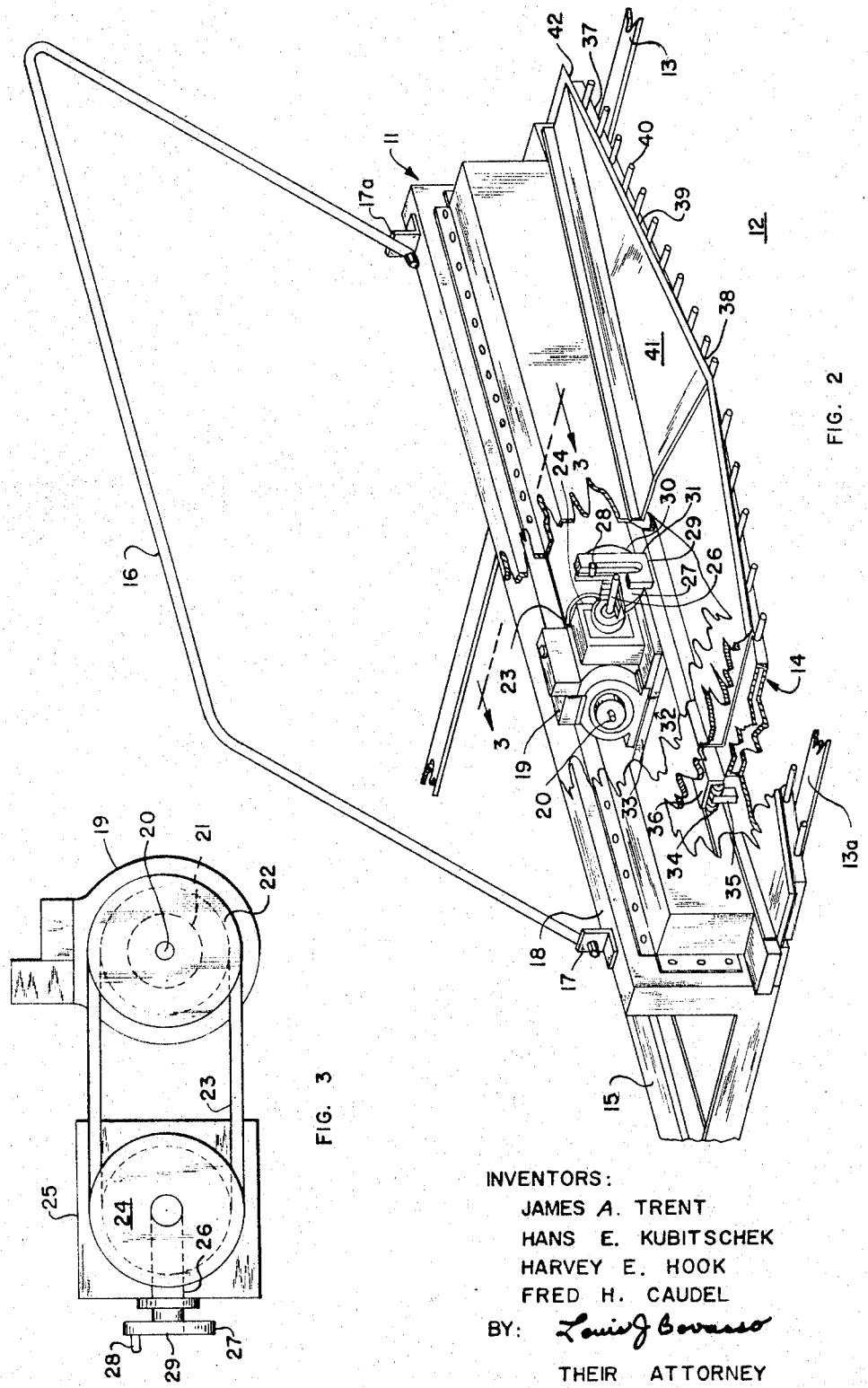

United States Patent Office 3,453,988
Patented July 8, 1969

3,453,988
PORTABLE FLOORING SPREADER
James A. Trent and Hans E. Kubitschek, Concord, and Harvey E. Hook, Danville, and Fred H. Caudel, Martinez, Calif., assignors to Shell Oil Company, New York, N.Y., a corporation of Delaware
Filed Oct. 9, 1967, Ser. No. 673,667
Int. Cl. B05c 11/04
U.S. Cl. 118—103          6 Claims

ABSTRACT OF THE DISCLOSURE

A portable device for spreading flooring material evenly over a surface. The device is adapted to engage spaced guide means mounted on a surface and a horizontally reciprocating screed assembly evenly distributes material released by a hopper at a point before the device and between the spaced guide means. Tines protrude from the leading edge of the screed and plow means are disposed above and forwardly of said screed. The leading edges of said screed and plow means being similarly configured and being each pointed outwardly in the direction of travel of said device.

BACKGROUND OF THE INVENTION

Field of the invention

The invention relates to a flooring spreader device, and, more particularly, to a portable device for spreading a flooring material evenly over a surface.

Description of the prior art

Various types of floor laying machines are known in the art. However, these machines are basically designed for road or larger paving operations. These pavers are large and bulky and cannot be manipulated in close quarters. They cannot be readily moved from one location to another.

In the past few years, epoxy resin floorings have been developed which can be applied to cement, asphalt, metal and wood surfaces to protect them from destruction by wear and exposure to outdoor weather conditions. One such resinous composition is described in Patent No. 3,156,660 to Scheibli. Although resin floorings are highly satisfactory for their contemplated use, the relatively high labor costs involved in laying such a floor place them outside of the market which includes many common competitive floorings.

SUMMARY OF THE INVENTION

It is an object of this invention to provide a flooring spreader which is adapted to lay large areas of floorings in a relatively short time.

It is a further object to provide a flooring spreader which is compact enough to manipulate in close quarters and lightweight enough to be moved easily from one location to another.

In a preferred embodiment of the invention, a portable device is provided which is adapted to spread a flooring material evenly over a surface. The spreader of this invention can be used to spread any type of flooring material capable of being dispersed by the hopper and spread by the screed assembly; however, it is particularly successful in spreading floorings of epoxy resinous compositions as discussed above.

The device for carrying out the objects of this invention includes a support which travels along spaced guide means mounted in or on the surface desired to be covered. A screed assembly is mounted on the support and is adapted to be reciprocated in a direction normal to the direction of travel of the support. The screed assembly is adapted to engage the upper surfaces of any material on the surface and between the guide means. A plow extends above and beyond the leading edge of the screed assembly in order to maintain a uniform thickness of any material carried ahead of the screed assembly. A hopper is mounted on the support and controlled by dispersing means for releasing a flooring material in front of the screed assembly and between the guide means. In this manner, the device can be used to lay a flooring smoothly and quickly between the guide means.

BRIEF DESCRIPTION OF THE DRAWING

FIGURE 2 is an isometric view similar to FIGURE 1 with the hopper removed and portions cut away; and FIGURE 3 is a detailed end view with portions cut away taken along lines 3—3 of FIGURE 2.

DESCRIPTION OF THE PREFERRED EMBODIMENT

Figure 1:
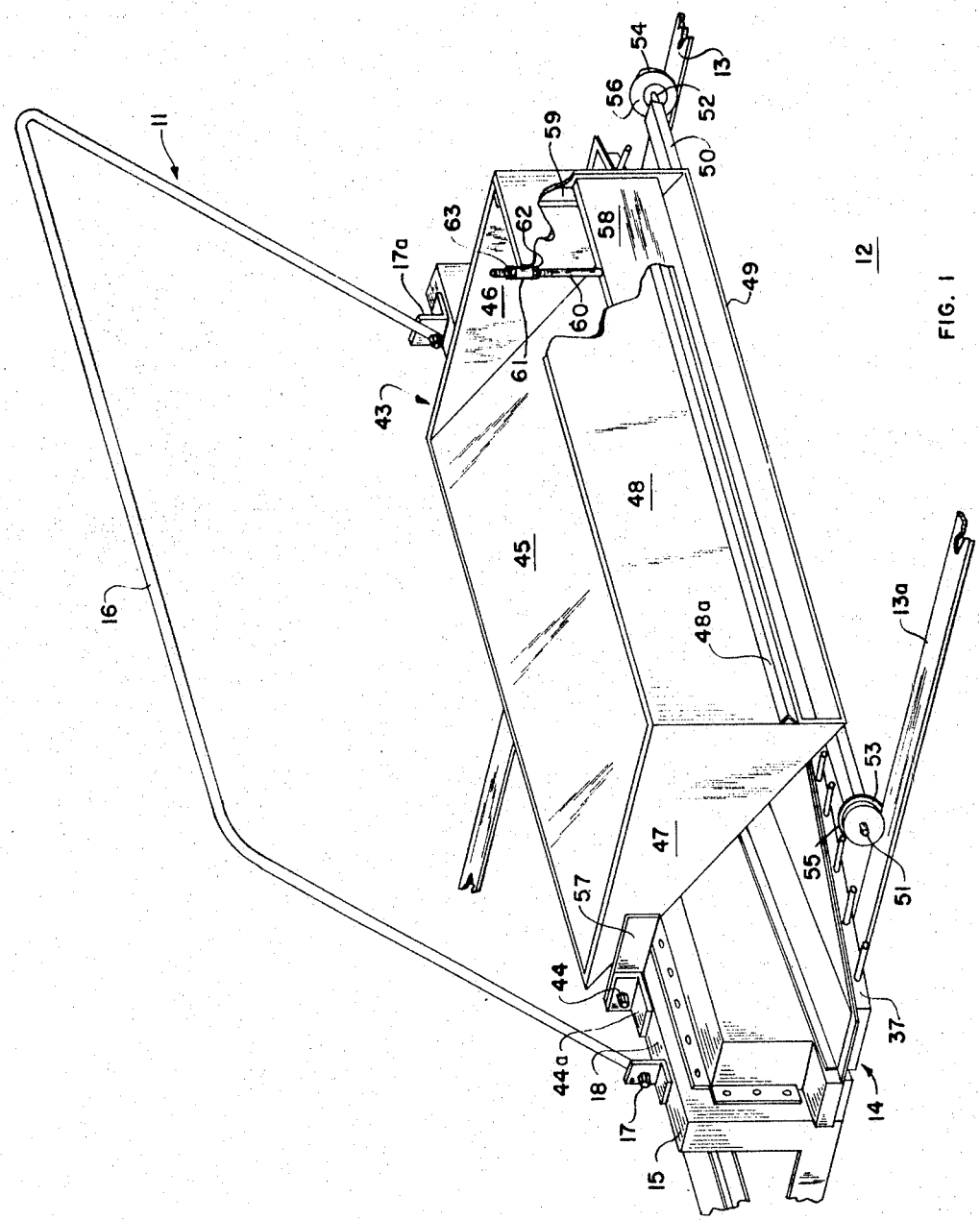
FIGURE 1 is an isometric view with portions cut away showing the device in operation.

Referring to the drawing, FIGURE 1 shows a device 11 for laying flooring material on a surface 12 which may be any type of surface adapted to be covered by a flooring material, indoors or outdoors.

A pair of spaced guide means, such as rails 13 and 13a, are mounted in or on surface 12. Rails 13 and 13a are parallel to one another and spaced from each other so as to provide an area therebetween for spreading flooring material on surface 12 as will be explained further hereinbelow.

Referring more particularly to FIGURE 2, device 11 includes a screed assembly 14 mounted on a support 15. Screed assembly 14 extends forwardly of support 15 and extends laterally a short distance beyond the extent of rails 13 and 13a so as to engage any material on surface 12 and between rails 13 and 13a. As can be seen in FIGURE 1, the lower surface of screed assembly 14 is adapted to engage any material in substantially the same plane as the upper surface of the rails 13 and 13a.

A handle 16 is preferably bolted or otherwise fastened to a pair of flanges 17 and 17a fixed to the upper surface 18 of support 15. Handle 16 is preferably adapted to be adjustably positioned thereon as is well known in the art. In this manner, the device 11 can be manually pulled over the rails 13 and 13a. Of course, any prime mover means, electrical or mechanical, hydraulic or pneumatic, can be used to propel device 11 over the surface 12. Alternatively, a uniform rate of propulsion may be accomplished by attaching the device 11 to a self-propelled device such as a tractor. In this manner, a uniform rate of pull is achieved which is desirable for obtaining a smooth laid surface.

Screed assembly 14 is adapted to be reciprocated in the horizontal direction, normal to the direction of travel of the device 11. Referring again to FIGURE 2, screed assembly 14 is preferably driven by a motor 19 having a horizontal drive shaft 20. A friction-type clutch 21 (FIGURE 3), having a V belt sheave 22 attached thereto, is fixed to drive shaft 20. Power from motor 19 is transmitted from sheave 22 through a V belt 23 to a pulley 24 having a conventional gear reduction assembly (not shown) attached thereto mounted in housing 25. Attached to the output shaft 26 of the gear reduction assembly is a hubbed wheel 27 that has a cam follower bearing 28 assembled on the outer edge of its face 29 as can best be seen in FIGURE 2.

Cam follower bearing 28 rides on the inside faces of a vertical slot 30 formed in an actuating post 31 which is welded or otherwise fastened to the upper portion 32 of screed assembly 14. As can be seen in FIGURE 2, portions of post 31 are cut away for convenience of illustration; in actuality, the slot 30 is an oblong slot formed in post 31 and providing a continuous surface for the cam follower 28 to roll against, or commonly known as a "scotch yoke."

The entire motive apparatus for actuating the screed assembly is mounted on a support plate 32 fixed to support 15. Screed assembly glides freely on ball bearing rollers 34 rotatably mounted on a post 35 fixed to support 15. Like rollers (not shown) are mounted on the opposite end of support 15 so that the screed assembly 14 is rollingly supported thereon. Screed assembly 14 has a U-shaped extension portion 36 attached thereto which opens downwardly and slidingly engages rollers 34 so that the assembly 14 may glide thereover.

In operation, upon actuating motor 19, drive shaft 20 rotates clutch 21 which engages belt sheave 22. V-belt 23 is rotated thereby and turns pulley 24 which actuates the input shaft of the reduction gear through which the output shaft 26 is driven. The hubbed wheel 27, attached to shaft 26, is rotated thereby and screed assembly 14 is reciprocated from side to side in relation to the normal direction of device 11, in a harmonic motion caused by the rotation of the cam follower bearing 28 in the slot 30 of the actuating post 31.

The leading edge 37 of screed assembly 14 is tapered forwardly to a point 38 as can best be seen in FIGURE 2. The front face 39 of screed assembly 14 has a plurality of tines 40 mounted thereon substantially equally spaced from one another and extending about the entire length of face 39. Tines 40 protrude forwardly and horizontally of screed assembly 14 so as to break up any heavily packed material which might pile up ahead of the assembly 14 and keep the material evenly distributed ahead of the screed assembly 14.

A plow 41 is firmly fixed to support 15 and extends over screed assembly 14 and beyond the leading edge 37 of assembly 14. The leading edge 42 of plow 41 is also tapered forwardly and thus conforms to the configuration of leading edge 37 of assembly 14. However, plow 41 does not extend beyond the ends of tines 40. In this manner, the plow 41 insures a uniform thickness to any flooring material being carried ahead of screed assembly 14. Any excess material is trimmed off by the leading edge 42 of plow 41. This excess material may be removed from the top side of the plow by the operator and disposed of in any manner desired.

Thus, in operation, vibrating screed assembly 14 rides on rails 13 and 13a previously laid on the surface 12. These rails 13 and 13a determine the width and thickness of the flooring material as well as act as guides for the device 11. As discussed previously, handle 16 may be used to pull or guide the device 11 over the rails 13 and 13a.

A hopper 43 is used to carry and dispense the material desired to be deposited on surface 12. In FIGURE 1, hopper 43 is attached to support 15 by means of a hinge bolt 44 passing through brackets 44a permitting the hopper to pivot up and down about hinge bolt 44.

Hopper 43 includes a downwardly sloping floor portion 45, a pair of triangularly shaped side walls 46 and 47 fastened to opposite ends of floor portion 45 and a front wall 48. Hopper 43 is open at the top and front wall 48 extends from the top of side walls 46 and 47 to a point just before the front edge 49 of the floor portion 45 of hopper 43.

An axle bar 50 is fastened to the bottom of floor portion 45 adjacent to its front edge 49 and extends outwardly beyond side walls 46 and 47. Axle bar 50 is preferably square-shaped so that it may be securely fastened to hopper 43 by conventional means (not shown) such as nails or screws. Cylindrical axle portions 51 and 52 are mounted on opposite ends of bar 50. Roller means, such as wheels 53 and 54, are rotatably mounted on axle portions 51 and 52, respectively. Wheels 53 and 54 have larger diameter portions 55 and 56, respectively, for limiting the lateral movement of hopper 43. Portions 55 and 56 are located inwardly of the free ends of axle portions 51 and 52 and abut against the inner side edges of rails 13 and 13a. In this manner, wheels 53 and 54 ride on rails 13 and 13a while portions 55 and 56, abutting against rails 13 and 13a, limit the lateral movement of hopper 43.

A pair of plates 57 are fixed to hopper 43, only one being shown for convenience of illustration in FIGURE 1, with hinge bolts 44 passing therethrough for rotating hopper 43 about the hinge bolt 44 as discussed previously.

A metering gate 58, attached to hopper 43, controls the amount of material distributed ahead of screed assembly 14. Since the front edge 49 of hopper 43 extends beyond the screed assembly 14, any material released by the hopper 43 is distributed in front of assembly 14.

A pair of guides 59, only one shown in FIGURE 1 for convenience of illustration, extend inwardly a short distance from the side walls 46 and 47 and parallel to front wall 48. In this manner, metering gate 58 can be raised and lowered between guides 59 and front wall 48.

A threaded rod 60 is fastened at one end to gate 58 and, at its opposite end, is slidable within an opening in a block 61 fastened to front wall 48. A pair of adjusting screws 62 and 63 are threaded on rod 60 and located on opposite sides of block 61. In this manner, the vertical position of gate 58 is adjustable so as to increase or decrease the amount of flooring material desired to be released from hopper 43.

A stiffener rib 48a preferably extends outwardly and across the face of front wall 48 so as to keep wall 48 from bowing outwardly and causing the opening at the bottom of hopper 43 to become non-uniform.

In operation, hopper 43 is loaded by the operator, either manually or automatically, and the height of gate 58 is adjusted by screws 62 and 63 so as to release the amount of flooring material desired. The material exits past gate 58 and through the opening formed between the front wall 48 and floor portion 45 and passes in front of screed assembly 14. The leading edge 42 of plow 41 permits a uniform thickness of material to be carried ahead of screed assembly 14. Tines 40, as discussed previously, break up any heavily packed material and evenly distributes the material ahead of assembly 14. The screed assembly 14 passes over the material and packs it evenly and uniformly between the guide rails 13 and 13a and below the lower surface of screed assembly 14.

Handle 16, attached to support 15, permits the device 11 to be maneuvered back and forth across surface 12. The device 11 can be readily transported from one place to another and cover large areas quickly and efficiently.

We claim as our invention:
1. A portable device adapted to be mounted on a surface and spread a flooring material evenly over the surface comprising, movable support means adapted to engage the surface and travel in a forward direction along said surface, a screed assembly mounted on said support means and adapted to engage any material on said surface and in front of said device, horizontal reciprocating means operatively engaging said screed assembly for reciprocating said assembly in a direction normal to the forward direction of travel of said support means, plow means mounted on said support means above said screed assembly and extending above and beyond the leading edge of said screed assembly so as to maintain a uniform thickness of any material carried ahead of the screed assembly, the leading edges of said plow means and said screed assembly being each pointed outwardly in the direction of travel of said device;

a plurality of tines protruding from the leading edge of the screed assembly and extending in a forward horizontal direction;

the leading edge of said plow means lying intermediate, the leading edge of the screed assembly and the free ends of the tines, hopper means mounted on said support means adapted to contain therein the flooring material, dispersing means operatively engaging said hopper means for dispersing said material from said hopper means, and said dispersing means being adapted, in cooperation with said hopper means, to disperse said material in front of said screed assembly whereby said material is evenly spread by said screed assembly on said surface.

2. The device of claim 1 wherein the horizontal reciprocating means comprises ball-bearing means mounted on said support means, said screed assembly engaging said ball bearing means and being adapted to glide freely thereon, motive means mounted on said support means having a rotary drive shaft with a friction clutch mounted thereon, belt sheave means operatively engaging said clutch and adapted to be driven thereby, a belt operatively engaging said belt sheave means, pulley means operatively engaging said belt and adapted to be driven thereby, a gear reduction assembly operatively engaging said pulley means and adapted to be driven thereby, said gear reduction assembly having a rotary output shaft, said shaft having a hubbed wheel attached thereto, cam follower bearing means protruding from the outer edge of the face of said wheel, and said cam follower bearing means engaging an elongated vertical slot formed in an actuating post fixed to the screed assembly.

3. The device of claim 1 wherein said tines extend about the entire leading edge of said screed assembly and are substantially equally spaced from each other.

4. The device of claim 1 including handle means attached to said support means for manually pulling said support means over said surface.

5. The device of claim 1 wherein the dispersing means includes vertically adustable metering gate means cooperating with the front portion of said hopper means to release a predetermined amount of material from said hopper means.

6. The device of claim 1 including spaced guide means mounted on said surface for guiding said device over the surface, the front portion of said hopper means includes lateral movement limiting wheel means attached thereto adapted to engage said guide means in front of said screed assembly so as to permit said material released by said dispersing means to be dispersed in front of said screed assembly and to limit lateral movement of said hopper means.

References Cited

UNITED STATES PATENTS

| | | | |
|---|---|---|---|
| 893,168 | 7/1908 | Hewitt | 94—45 |
| 1,388,690 | 8/1921 | Baker | 94—45 |
| 2,185,645 | 1/1940 | Mosel | 94—45 |
| 2,248,247 | 7/1941 | Nichols | 94—45 |
| 2,473,961 | 6/1949 | Mandt et al. | 94—45 |
| 2,592,960 | 4/1952 | Schulze | 94—45 |
| 2,664,794 | 1/1954 | Evans | 94—46 |
| 3,000,277 | 9/1961 | Crane et al. | 94—45 |
| 3,161,115 | 12/1964 | Larson et al. | 94—45 |

FOREIGN PATENTS

| | | |
|---|---|---|
| 544,750 | 2/1956 | Belgium. |
| 508,725 | 1/1955 | Canada. |
| 751,288 | 6/1956 | Great Britain. |

MORRIS KAPLAN, *Primary Examiner.*

U.S. Cl. X.R.

94—45; 118—108, 120